US011915666B2

(12) United States Patent
Sung et al.

(10) Patent No.: US 11,915,666 B2
(45) Date of Patent: Feb. 27, 2024

(54) DISPLAY DEVICE, DISPLAY DRIVING INTEGRATED CIRCUIT, AND OPERATION METHOD

(71) Applicant: Novatek Microelectronics Corp., Hsinchu (TW)

(72) Inventors: Jung-Hsuan Sung, Hsinchu (TW); Kai-Wen Shao, Hsinchu (TW); Chien-Yu Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/746,988

(22) Filed: May 18, 2022

(65) Prior Publication Data

US 2023/0377534 A1 Nov. 23, 2023

(51) Int. Cl.

| | |
|---|---|
| ***G09G 3/3275*** | (2016.01) |
| ***G09G 3/20*** | (2006.01) |
| ***G09G 5/00*** | (2006.01) |

(52) U.S. Cl.

CPC ........... *G09G 5/008* (2013.01); *G09G 3/2096* (2013.01); *G09G 3/3275* (2013.01); *G09G 2310/0264* (2013.01); *G09G 2320/04* (2013.01)

(58) Field of Classification Search

CPC .... G09G 5/008; G09G 3/2096; G09G 3/3275; G09G 2310/0264; G09G 2320/04

See application file for complete search history.

(56) References Cited

U.S. PATENT DOCUMENTS

| | | | | |
|---|---|---|---|---|
| 5,844,540 | A * | 12/1998 | Terasaki | G09G 3/3406 345/87 |
| 7,339,582 | B2 * | 3/2008 | Akahori | G09G 5/006 345/204 |
| 7,864,153 | B2 * | 1/2011 | Yun | G09G 3/2092 345/99 |
| 9,111,509 | B2 * | 8/2015 | Kim | G09G 3/3688 |
| 9,165,509 | B2 * | 10/2015 | Saitoh | G09G 3/34 |
| 9,196,183 | B2 * | 11/2015 | Hwang | G09G 3/20 |
| 9,729,681 | B2 * | 8/2017 | Lee | H04L 7/0025 |
| 10,001,886 | B2 * | 6/2018 | Han | G09G 3/3648 |

(Continued)

FOREIGN PATENT DOCUMENTS

| | | |
|---|---|---|
| CN | 102316287 | 1/2012 |
| TW | 202121893 | 6/2021 |

OTHER PUBLICATIONS

"Office Action of Taiwan Counterpart Application", dated Sep. 12, 2023, p. 1-p. 5.

*Primary Examiner* — Michael J Jansen, II
(74) *Attorney, Agent, or Firm* — JCIPRNET

(57) ABSTRACT

A display device, a display driving integrated circuit (DDIC), and an operation method are provided. The display device includes a display panel, a first DDIC, and a second DDIC. The first DDIC generates a display synchronization signal, and drives a first display area of a display panel according to the display synchronization signal. The second DDIC is coupled to the first DDIC to receive the display synchronization signal. The second DDIC performs a frequency tracking operation on an internal clock signal of the second DDIC by selectively using the display synchronization signal. The second DDIC drives a second display area of the display panel according to the internal clock signal and the display synchronization signal.

12 Claims, 6 Drawing Sheets

(56) References Cited

U.S. PATENT DOCUMENTS 10,602,468 B2 * 3/2020 Boehlke .................. H04R 5/04
10,796,661 B2 * 10/2020 Park ......................... G09G 5/14
10,950,197 B2 * 3/2021 Pyun ......................... G06F 1/08
11,210,985 B2 12/2021 Yeh et al.
11,429,225 B2 * 8/2022 Akiyoshi .............. G06F 3/0412
11,756,488 B2 * 9/2023 Kim ....................... G09G 5/003
345/214
2005/0012705 A1 * 1/2005 Akahori ................. G09G 5/006
345/99
2006/0001631 A1 * 1/2006 Yamazaki ................ G09G 3/20
345/98
2007/0229418 A1 * 10/2007 Yun ...................... G09G 3/2092
345/87
2012/0133661 A1 * 5/2012 Lee ...................... G09G 3/3688
345/204
2013/0038597 A1 * 2/2013 Kim ..................... G09G 3/3688
345/204
2014/0049533 A1 * 2/2014 Saitoh ....................... G06F 1/26
345/213
2015/0002488 A1 * 1/2015 Hwang .................... G09G 3/20
345/204
2015/0042637 A1 * 2/2015 Lin .......................... G09G 3/20
345/213
2015/0103038 A1 * 4/2015 Han ...................... G06F 3/0443
345/98
2015/0350389 A1 * 12/2015 Lee ....................... H04L 7/0025
370/474
2019/0297589 A1 9/2019 Boehlke et al.
2020/0098330 A1 * 3/2020 Pyun ......................... G06F 1/08
2020/0118517 A1 * 4/2020 Park ......................... G09G 5/14
2021/0166598 A1 6/2021 Yeh et al.
2021/0303126 A1 * 9/2021 Akiyoshi .............. G06F 3/0446
2022/0262316 A1 * 8/2022 Kim ....................... G09G 5/003
2023/0133606 A1 * 5/2023 Kim ..................... G09G 3/3275
375/150

* cited by examiner

DISPLAY DEVICE, DISPLAY DRIVING INTEGRATED CIRCUIT, AND OPERATION METHOD

BACKGROUND

Technical Field

The disclosure relates to an electronic device, and more particularly to a display device, a display driving integrated circuit, and an operation method.

Description of Related Art

The organic light emitting diode (OLED) panel has the characteristic of being bendable, so there are many application manners of bending, such as foldable and rollable. Based on the operation situation of bending, the OLED panel is divided into multiple display areas to implement applications such as dual-screen, triple-screen, or more screens. In an actual operation situation, the display operation of each display area (screen) may be independent, so different display areas are driven by different driving integrated circuits. Each driving integrated circuit has an oscillator for generating an internal clock. The internal clock frequencies of different driving integrated circuits should be consistent. Whether the internal clock frequencies of the driving integrated circuits are consistent affects the image quality of the OLED panel.

SUMMARY

The disclosure provides a display device, a display driving integrated circuit, and an operation method to perform a frequency tracking operation on an original internal clock signal of the display driving integrated circuit to generate a tracked internal clock signal.

In an embodiment of the disclosure, the display device includes a display panel, a first display driving integrated circuit, and a second display driving integrated circuit. The display panel includes multiple display areas. The first display driving integrated circuit is coupled to the display panel. The first display driving integrated circuit generates a display synchronization signal, and drives a first display area among the display areas according to the display synchronization signal. The second display driving integrated circuit is coupled to the display panel. The second display driving integrated circuit is also coupled to the first display driving integrated circuit to receive the display synchronization signal. The second display driving integrated circuit performs a frequency tracking operation on an original internal clock signal of the second display driving integrated circuit to generate a tracked internal clock signal by selectively using the display synchronization signal. The second display driving integrated circuit drives a second display area among the display areas according to the tracked internal clock signal and the display synchronization signal.

In an embodiment of the disclosure, the display driving integrated circuit includes a display synchronization signal pin, a frequency tracking circuit, and a display driving circuit. The display synchronization signal pin is configured to receive a display synchronization signal. The frequency tracking circuit is coupled to the display synchronization signal pin. The frequency tracking circuit performs a frequency tracking operation on an original internal clock signal to generate a tracked internal clock signal by selectively using the display synchronization signal. The display driving circuit is coupled to the display synchronization signal pin. The display driving circuit is also coupled to the frequency tracking circuit to receive the tracked internal clock signal. The display driving circuit is configured to drive a display panel according to the tracked internal clock signal and the display synchronization signal.

In an embodiment of the disclosure, the operation method of a display driving integrated circuit includes the following steps. A frequency tracking operation is performed on an original internal clock signal to generate a tracked internal clock signal by selectively using the display synchronization signal. A display panel is driven according to the tracked internal clock signal and the display synchronization signal.

Based on the above, the display driving integrated circuit according to an embodiment of the disclosure may perform the frequency tracking operation on its own original internal clock signal to generate a tracked internal clock signal by using the display synchronization signals provided by other display driving integrated circuits, so that the frequency of its own tracked internal clock signal is consistent with the frequencies of the internal clock signals of other display driving integrated circuits.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
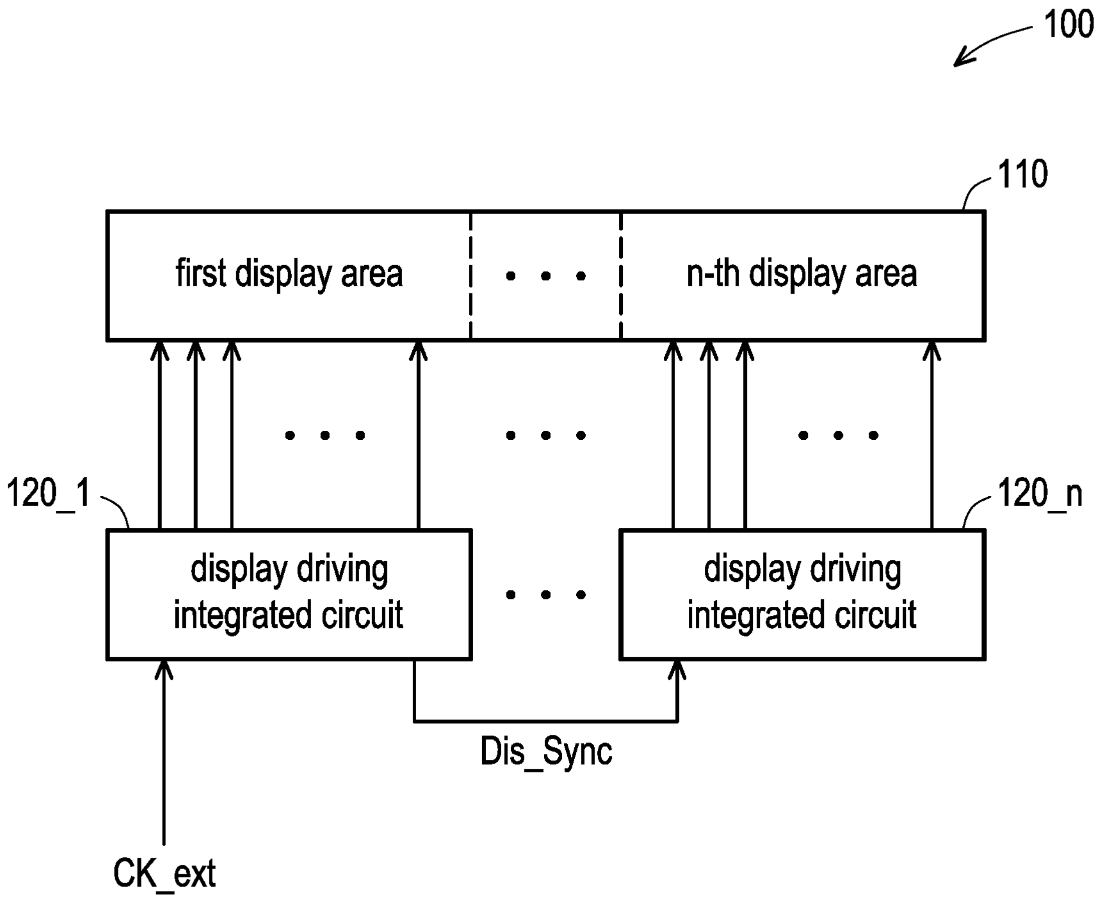
FIG. 1 is a schematic diagram of a circuit block of a display device according to an embodiment of the disclosure.

The term "coupling (or connection)" used in the entire specification (including the claims) of the present application may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the present application are used to name the elements or to distinguish between different embodiments or ranges, but not to limit the upper limit or the lower limit of the number of elements or to limit the sequence of the elements. In addition, wherever possible, elements/components/steps using the same reference numerals in the drawings and embodiments represent the same or similar parts. Related descriptions of the elements/components/steps using the same reference numerals or using the same terminologies in different embodiments may be cross-referenced.

FIG. 1 is a schematic diagram of a circuit block of a display device 100 according to an embodiment of the disclosure. The display device 100 shown in FIG. 1 includes a display panel 110 and multiple display driving integrated circuits (DDICs) 120_1, . . . , 120_*n*. According to an actual design, the display panel 110 may be a bendable display panel, such as an organic light emitting diode (OLED) panel or other display panels. The display panel 110 includes multiple display areas, such as a first display area, . . . , and an n-th display area shown in FIG. 1. A number n of display areas of the display panel 110 may be determined according to the actual design.

The DDIC 120_1 is coupled to the display panel 110. The DDIC 120_1 performs a frequency tracking operation on an original internal clock signal of the DDIC 120_1 to generate a tracked internal clock signal by selectively using an external clock signal CK_ext provided by an external circuit (not shown). For example, an application processor (AP, not shown) sends a mobile industry processor interface (MIPI) signal to the DDIC 120_1 for display operation. The DDIC 120_1 may use the MIPI signal as the external clock signal CK_ext. The DDIC 120_1 may calculate an offset of its own original internal clock signal according to the external clock signal CK_ext, thereby adjusting its own internal oscillator frequency to implement the frequency tracking operation of the original internal clock signal. The frequency tracking operation may enable the tracked internal clock signal of the DDIC 120_1 to maintain frequency consistency in different environments.

The DDIC 120_1 may generate a display synchronization signal Dis_sync according to its own tracked internal clock signal. The DDIC 120_1 drives a display area (for example, the first display area) of the display panel 110 according to its tracked internal clock signal and the display synchronization signal Dis_sync. According to the actual design, the display synchronization signal Dis_sync may include a vertical sync (VS) signal, a horizontal sync (HS) signal, or other synchronization signals for display control. The DDIC 120_1 also provides the display synchronization signal Dis_sync to other DDICs (for example, the DDIC 120_*n*).

The DDIC 120_*n* is coupled to the display panel 110. The DDIC 120_*n* is also coupled to the DDIC 120_1 to receive the display synchronization signal Dis_sync. According to the actual design, the display synchronization signal Dis_sync may include a VS signal, an HS signal, or other synchronization signals for display control. The DDIC 120_*n* may perform the frequency tracking operation on an original internal clock signal to generate a tracked internal clock signal of the DDIC 120_*n* by selectively using the display synchronization signal Dis_sync provided by the DDIC 120_1. Based on the frequency tracking operation, the frequency of the tracked internal clock signal of the DDIC 120_*n* should be consistent with the frequency of the tracked internal clock signal of the DDIC 120_1. According to the tracked internal clock signal of the DDIC 120_*n* and the display synchronization signal Dis_sync provided by the DDIC 120_1, the DDIC 120_*n* may drive another display area (for example, the n-th display area) of the display panel 110.

Figure 2:
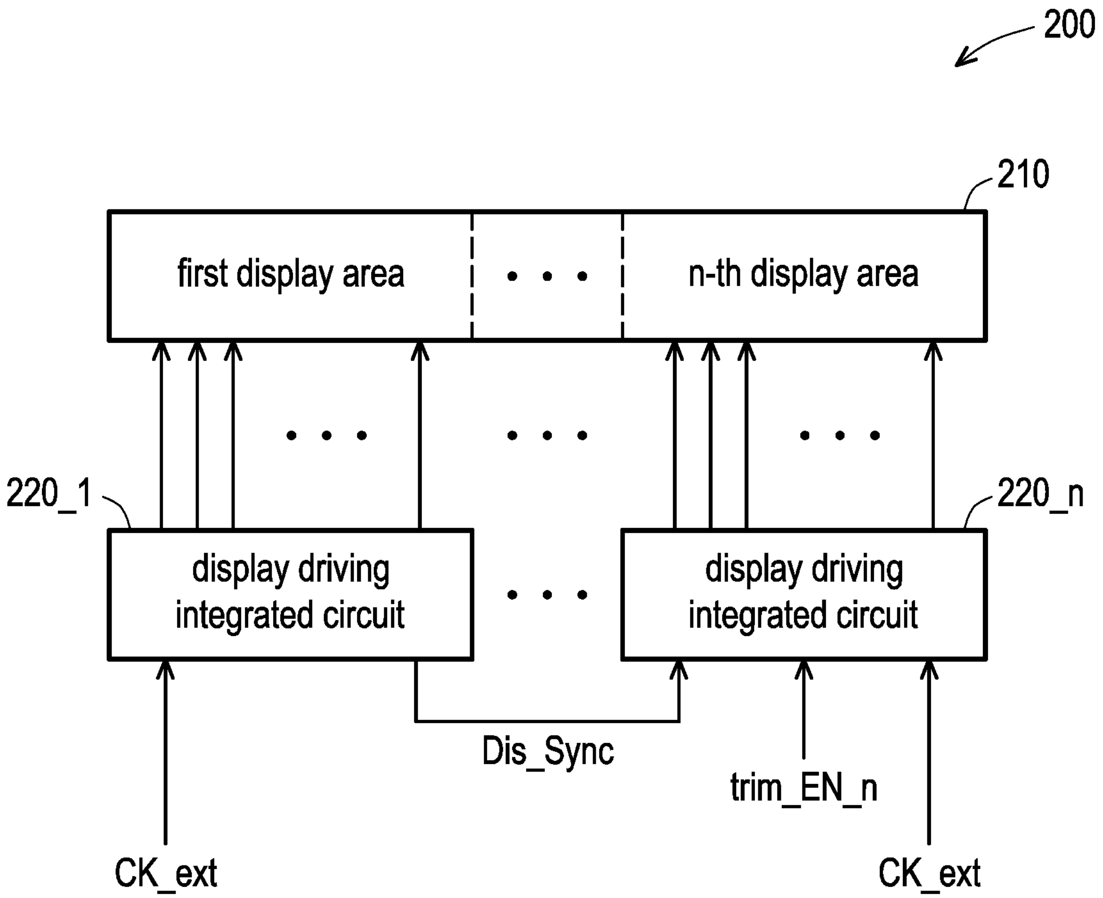
FIG. 2 is a schematic diagram of a circuit block of a display device according to another embodiment of the disclosure.

FIG. 2 is a schematic diagram of a circuit block of a display device 200 according to another embodiment of the disclosure. The display device 200 shown in FIG. 2 includes a display panel 210 and multiple display driving integrated circuits (DDICs) 220_1, . . . , 220_*n*. The display device 200, the display panel 210, and the DDICs 220_1 to 220_*n* shown in FIG. 2 may be analogized with reference to the related descriptions of the display device 100, the display panel 110, and the DDICs 120_1 to 120_*n* shown in FIG. 1, so there will be no repetition. In the embodiment shown in FIG. 2, the DDIC 220_*n* may receive an external clock signal CK_ext and an enable signal trim_EN_n from an external circuit (not shown, such as an application processor). The DDIC 220_*n* may select one of a display synchronization signal Dis_sync and the external clock signal CK_ext as a selected frequency tracking reference clock according to the enable signal trim_EN_n. The DDIC 220_*n* may perform a frequency tracking operation on an original internal clock signal of the DDIC 220_*n* to generate a tracked internal clock signal by using the selected frequency tracking reference clock, so that the frequency of the tracked internal clock signal of the DDIC 120_*n* is consistent with the frequency of the tracked internal clock signal of the DDIC 120_1.

For example, the application processor (not shown) sends an MIPI signal to the DDIC 120_1 and the DDIC 120_*n* to update a first display area and an n-th display area of the display panel 110. At this time, the DDIC 120_*n* may use the MIPI signal as the external clock signal CK_ext, and select the external clock signal CK_ext as the selected frequency tracking reference clock, thereby performing the frequency tracking operation on the original internal clock signal of the DDIC 220_*n* to generate a tracked internal clock signal by using the selected frequency tracking reference clock. In certain operation situations, the n-th display area of the display panel 110 displays a static image, that is, the application processor may pause sending the MIPI signal (the external clock signal CK_ext) to the DDIC 120_*n*. During a period when the application processor pauses sending the external clock signal CK_ext to the DDIC 120_*n*, the application processor may notify the DDIC 120_*n* by the enable signal trim_EN_n. The DDIC 220_*n* may select the display synchronization signal Dis_sync as the selected frequency tracking reference clock according to the enable signal trim_EN_n, and perform the frequency tracking operation on the original internal clock signal of the DDIC 220_*n* to generate a tracked internal clock signal by using the selected frequency tracking reference clock, so that the frequency of the tracked internal clock signal of the DDIC 120_*n* is consistent with the frequency of the tracked internal clock signal of the DDIC 120_1.

Figure 3:
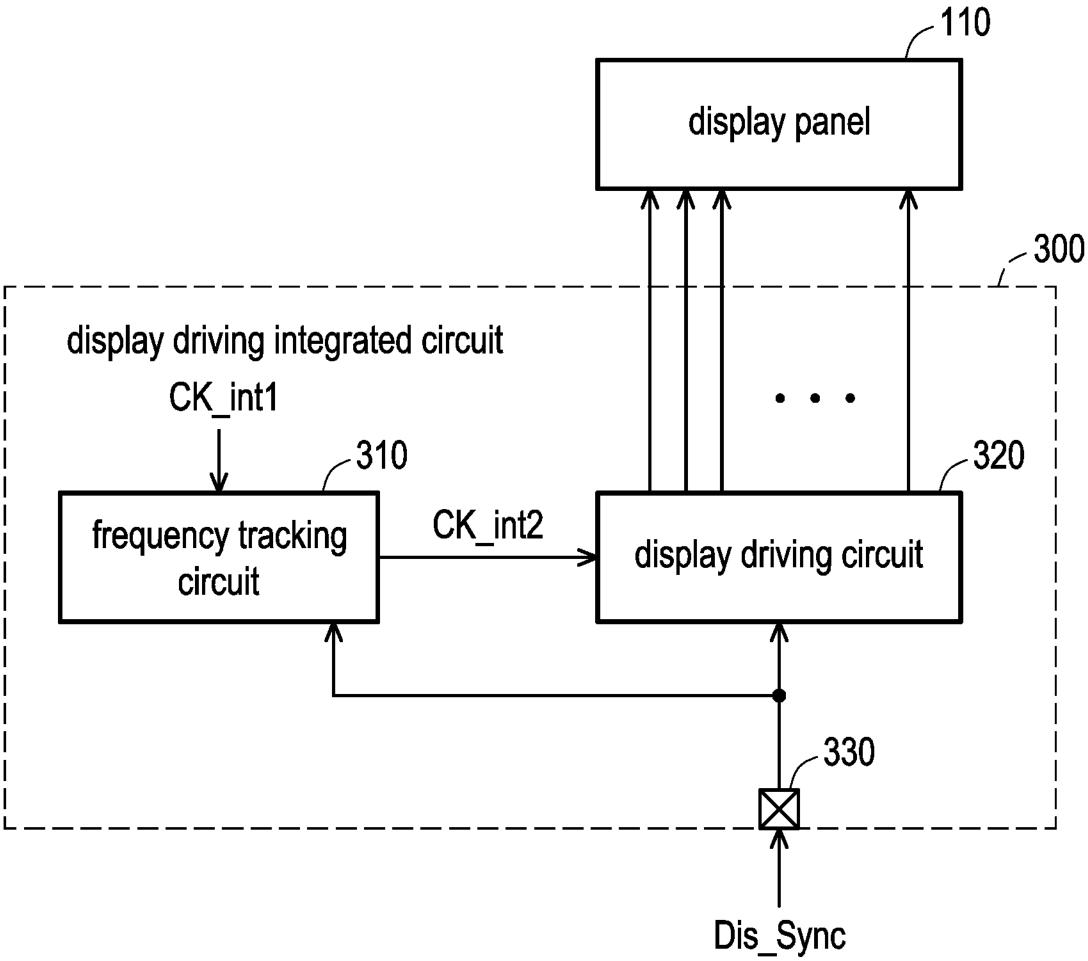
FIG. 3 is a schematic diagram of a circuit block of a display driving integrated circuit (DDIC) according to an embodiment of the disclosure.

FIG. 3 is a schematic diagram of a circuit block of a display driving integrated circuit (DDIC) 300 according to an embodiment of the disclosure. For the display driving integrated circuit shown in FIG. 1 (for example, the DDIC 120_*n* or other DDICs), reference may be made to the related description of the DDIC 300 shown in FIG. 3. For the DDIC 300 shown in FIG. 3, reference may be made to the related description of the DDIC 120_*n* shown in FIG. 1. In the embodiment shown in FIG. 3, the DDIC 300 includes a frequency tracking circuit 310, a display driving circuit 320, and a display synchronization signal pin 330. The display synchronization signal pin 330 is configured to receive a display synchronization signal Dis_sync from other DDICs. According to the actual design, the display synchronization signal Dis_sync may include a VS signal, an HS signal, or other synchronization signals for display control.

Figure 4:
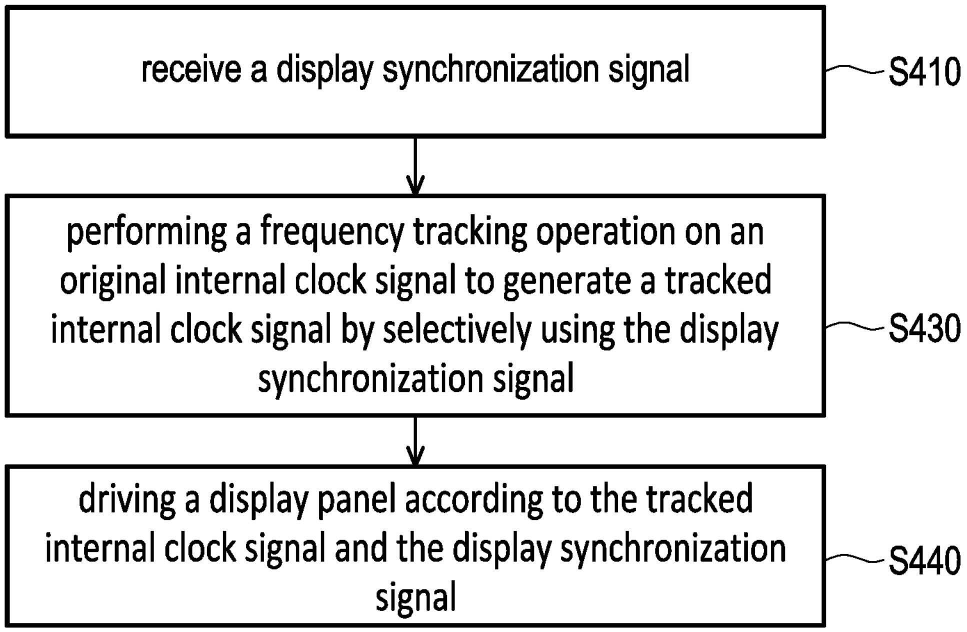
FIG. 4 is a schematic flowchart of an operation method of a display driving integrated circuit according to an embodiment of the disclosure.

FIG. 4 is a schematic flowchart of an operation method of a display driving integrated circuit according to an embodiment of the disclosure. Please refer to FIG. 3 and FIG. 4. The frequency tracking circuit 310 is coupled to the display synchronization signal pin 330 to receive the display synchronization signal Dis_sync (Step S410). The frequency tracking circuit 310 may perform the frequency tracking operation on the original internal clock signal CK_int1 of the DDIC 300 to generate a tracked internal clock signal CK_int2 by selectively using the display synchronization signal Dis_sync (Step S430), so that the frequency of the tracked internal clock signal CK_int2 of the DDIC 300 is consistent with the frequencies of the tracked internal clock signals of other DDICs. The display driving circuit 320 is coupled to the display synchronization signal pin 330 to receive the display synchronization signal Dis_sync. The display driving circuit 320 is also coupled to the frequency tracking circuit 310 to receive the tracked internal clock signal CK_int2. The display driving circuit 320 may drive a display area of the display panel 110 according to the tracked internal clock signal CK_int2 and the display synchronization signal Dis_sync (Step S440).

Figure 5:
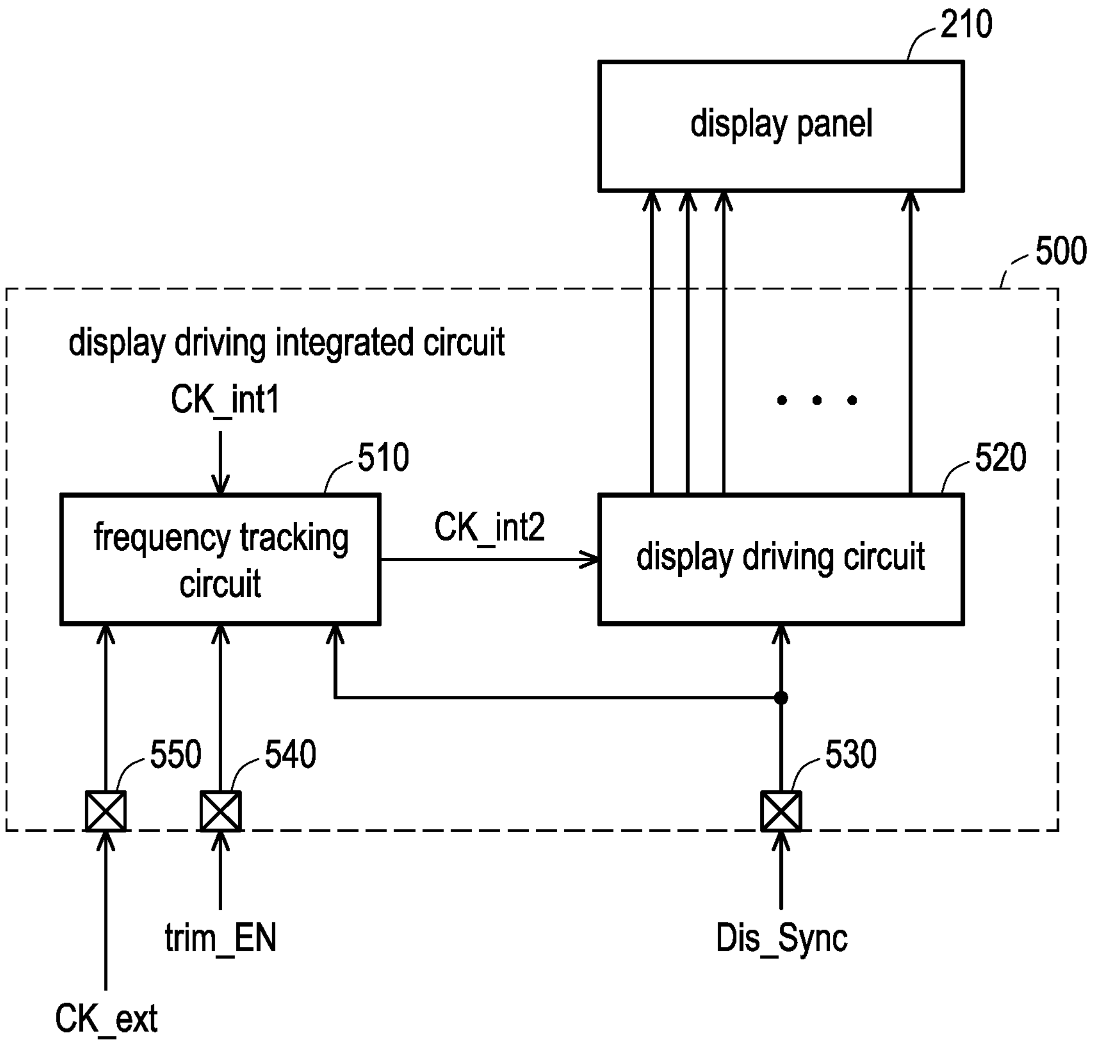
FIG. 5 is a schematic diagram of a circuit block of a display driving integrated circuit (DDIC) according to another embodiment of the disclosure.

FIG. 5 is a schematic diagram of a circuit block of a display driving integrated circuit (DDIC) 500 according to another embodiment of the disclosure. For the display driving integrated circuit (for example, the DDIC 220_*n* or other DDICs) shown in FIG. 2, reference may be made to the related description of the DDIC 500 shown in FIG. 5. For the DDIC 500 shown in FIG. 5, reference may be made to the related description of the DDIC 220_*n* shown in FIG. 2. In the embodiment shown in FIG. 5, the DDIC 500 includes a frequency tracking circuit 510, a display driving circuit 520, a display synchronization signal pin 530, an enable pin 540, and an external clock pin 550. The display synchronization signal pin 530 is configured to receive a display synchronization signal Dis_sync from other DDICs. According to the actual design, the display synchronization signal Dis_sync may include a VS signal, an HS signal, or other synchronization signals for display control. The external clock pin 550 is configured to receive an external clock signal CK_ext. The enable pin 540 is configured to receive an enable signal trim_EN. The external clock signal CK_ext and the enable signal trim_EN shown in FIG. 5 may be analogized with reference to the related descriptions of the external clock signal CK_ext and the enable signal trim_EN_n shown in FIG. 2, so there will be no repetition.

In the embodiment shown in FIG. 5, the frequency tracking circuit 510 is coupled to the display synchronization signal pin 530 to receive the display synchronization signal Dis_sync. The frequency tracking circuit 510 may generate the tracked internal clock signal CK_int2 to the display driving circuit 520. The frequency tracking circuit 510 is also coupled to the enable pin 540 and the external clock pin 550. The frequency tracking circuit 510 may select one of the display synchronization signal Dis_sync and the external clock signal CK_ext as a selected frequency tracking reference clock according to the enable signal trim_EN. The frequency tracking circuit 510 may perform a frequency tracking operation on the original internal clock signal CK_int1 to generate a tracked internal clock signal CK_int2 by using the selected frequency tracking reference clock, so that the frequency of the tracked internal clock signal CK_int2 of the DDIC 500 is consistent with the frequencies of the tracked internal clock signals of other DDICs. The display driving circuit 520 is coupled to the display synchronization signal pin 530 to receive the display synchronization signal Dis_sync. The display driving circuit 520 is also coupled to the frequency tracking circuit 510 to receive the tracked internal clock signal CK_int2. The display driving circuit 520 may drive a display area of the display panel 210 according to the tracked internal clock signal CK_int2 and the display synchronization signal Dis_sync.

Figure 6:
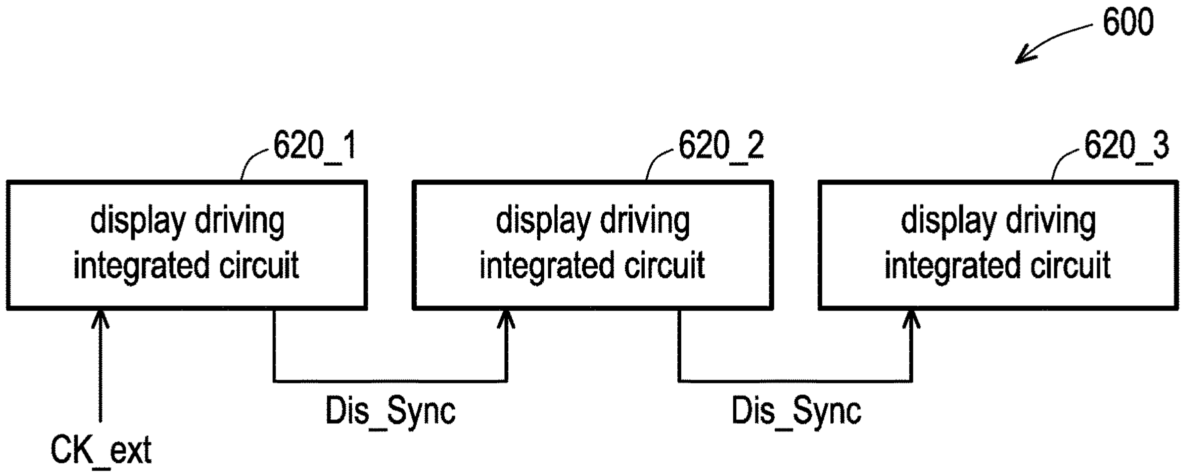
FIG. 6 is a schematic diagram of a circuit block of a display device according to yet another embodiment of the disclosure.

FIG. 6 is a schematic diagram of a circuit block of a display device 600 according to yet another embodiment of the disclosure. The display device 600 shown in FIG. 6 includes display driving integrated circuits (DDICs) 620_1, 620_2, and 620_3. For the display device 600 and the DDIC 620_1 shown in FIG. 6, reference may be made to the related descriptions of the display device 100 and the DDIC 120_1 shown in FIG. 1, and for the DDICs 620_2 and 620_3 shown in FIG. 6, reference may be made to the related description of the DDIC 120_n shown in FIG. 1. For example, for the implementation of the DDICs 620_2 and 620_3 shown in FIG. 6, reference may be made to the related description of the DDIC 300 shown in FIG. 3. Alternatively, for the display device 600 and the DDIC 620_1 shown in FIG. 6, reference may be made to the related descriptions of the display device 200 and the DDIC 220_1 shown in FIG. 2, and for the DDICs 620_2 and 620_3 shown in FIG. 6, reference may be made to the related description of the DDIC 220_*n* shown in FIG. 2. For example, for the implementation of the DDICs 620_2 and 620_3 shown in FIG. 6, reference may be made to the related description of the DDIC 500 shown in FIG. 5.

In the embodiment shown in FIG. 6, the DDIC 620_1 may provide a display synchronization signal Dis_sync to the DDIC 620_2. According to the actual design, the display synchronization signal Dis_sync may include a VS signal, an HS signal, or other synchronization signals for display control. The DDIC 620_2 may perform a frequency tracking operation on an original internal clock signal of the DDIC 620_2 to generate a tracked internal clock signal of the DDIC 620_2 by selectively using the display synchronization signal Dis_sync provided by the DDIC 620_1. The DDIC 620_2 may transmit the display synchronization signal Dis_sync to the DDIC 620_3. The DDIC 620_3 may perform the frequency tracking operation on an original internal clock signal of the DDIC 620_3 to generate a tracked internal clock signal of the DDIC 620_3 by selectively using the display synchronization signal Dis_sync from the DDIC 620_2. Therefore, the frequency of the tracked internal clock signal of the DDIC 620_1, the frequency of the tracked internal clock signal of the DDIC 620_2, and the frequency of the tracked internal clock signal of the DDIC 620_3 may be consistent with one another.

Figure 7:
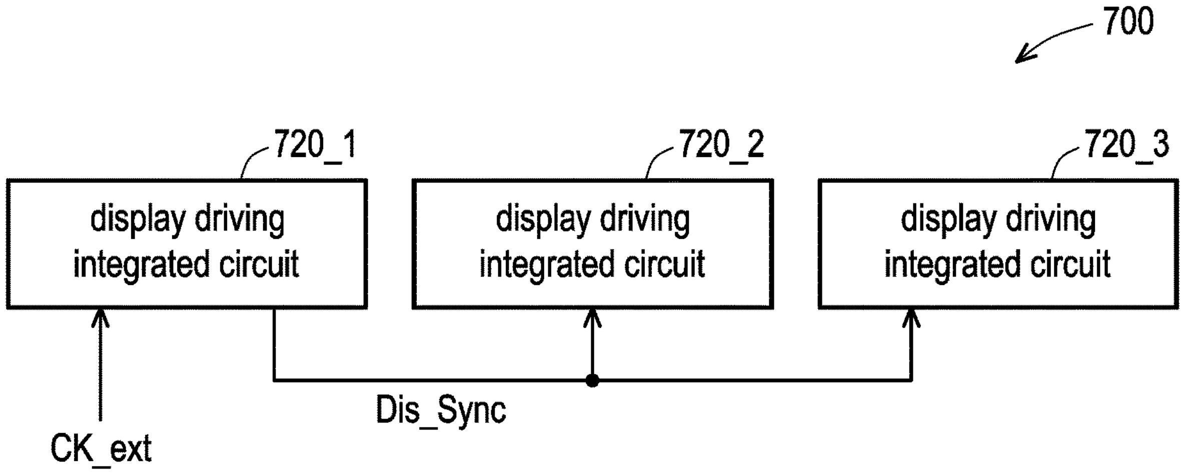
FIG. 7 is a schematic diagram of a circuit block of a display device according to still another embodiment of the disclosure.

FIG. 7 is a schematic diagram of a circuit block of a display device 700 according to still another embodiment of the disclosure. The display device 700 shown in FIG. 7 includes display driving integrated circuits (DDICs) 720_1, 720_2, and 720_3. For the display device 700 and the DDIC 720_1 shown in FIG. 7, reference may be made to the related descriptions of the display device 100 and the DDIC 120_1 shown in FIG. 1, and for the DDICs 720_2 and 720_3 shown in FIG. 7, reference may be made to the related description of the DDIC 120_*n* shown in FIG. 1. For example, for the implementation of the DDICs 720_2 and 720_3 shown in FIG. 7, reference may be made to the related description of the DDIC 300 shown in FIG. 3. Alternatively, for the display device 700 and the DDIC 720_1 shown in FIG. 7, reference may be made to the related descriptions of the display device 200 and the DDIC 220_1 shown in FIG. 2, and for the DDICs 720_2 and 720_3 shown in FIG. 7, reference may be made to the related description of the DDIC 220_*n* shown in FIG. 2. For example, for the implementation of the DDICs

720_2 and 720_3 shown in FIG. 7, reference may be made to the related description of the DDIC 500 shown in FIG. 5.

In the embodiment shown in FIG. 7, the DDIC 720_1 may provide a display synchronization signal Dis_sync to the DDIC 720_2 and the DDIC 720_3. According to the actual design, the display synchronization signal Dis_sync may include a VS signal, an HS signal, or other synchronization signals for display control. The DDIC 720_2 may perform a frequency tracking operation on an original internal clock signal of the DDIC 720_2 to generate a tracked internal clock signal of the DDIC 720_2 by selectively using the display synchronization signal Dis_sync provided by the DDIC 720_1. The DDIC 720_3 may perform the frequency tracking operation on an original internal clock signal of the DDIC 720_3 to generate a tracked internal clock signal of the DDIC 720_3 by selectively using the display synchronization signal Dis_sync from the DDIC 720_1. Therefore, the frequency of the tracked internal clock signal of the DDIC 720_1, the frequency of the tracked internal clock signal of the DDIC 720_2, and the frequency of the tracked internal clock signal of the DDIC 720_3 may be consistent with one another.

In summary, the display driving integrated circuit (DDIC) of the above embodiments may perform the frequency tracking operation on its own original internal clock signal CK_int1 to generate a tracked internal clock signal CK_int2 by using the display synchronization signals Dis_sync provided by other DDICs, so that the frequency of its own tracked internal clock signal CK_int2 is consistent with the frequencies of the tracked internal clock signals of other DDICs.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display device, comprising:

a display panel, comprising a plurality of display areas;

a first display driving integrated circuit, coupled to the display panel, wherein the first display driving integrated circuit generates a display synchronization signal, and drives a first display area among the display areas according to the display synchronization signal; and a second display driving integrated circuit, coupled to the display panel, wherein the second display driving integrated circuit is coupled to the first display driving integrated circuit to receive the display synchronization signal, the second display driving integrated circuit performs a frequency tracking operation on an original internal clock signal of the second display driving integrated circuit to generate a tracked internal clock signal by selectively using the display synchronization signal as a frequency tracking reference clock, wherein the frequency tracking operation is performed by calculating an offset between the original internal clock signal of the second display driving integrated circuit and the frequency tracking reference clock and adjusting a frequency of the original internal clock signal of the second display driving integrated circuit to be consistent with a frequency of the frequency tracking reference clock, and the second display driving integrated circuit drives a second display area among the display areas according to the tracked internal clock signal.

2. The display device according to claim 1, wherein the display panel is a bendable display panel.

3. The display device according to claim 1, wherein the display synchronization signal comprises a vertical sync signal or a horizontal sync signal.

4. The display device according to claim 1, wherein the second display driving integrated circuit receives an external clock signal, the second display driving integrated circuit selects one of the display synchronization signal and the external clock signal as the frequency tracking reference clock according to an enable signal.

5. The display device according to claim 1, wherein the second display driving integrated circuit comprises:

a display synchronization signal pin, configured to receive the display synchronization signal;

a frequency tracking circuit, coupled to the display synchronization signal pin, wherein the frequency tracking circuit is configured to generate the tracked internal clock signal, and the frequency tracking circuit performs the frequency tracking operation on the original internal clock signal of the second display driving integrated circuit by selectively using the display synchronization signal; and a display driving circuit, coupled to the display synchronization signal pin, wherein the display driving circuit is coupled to the frequency tracking circuit to receive the tracked internal clock signal, and the display driving circuit is configured to drive the second display area among the display areas according to the tracked internal clock signal and the display synchronization signal.

6. The display device according to claim 5, wherein the second display driving integrated circuit further comprises:

an external clock pin, configured to receive an external clock signal; and an enable pin, configured to receive an enable signal, wherein the frequency tracking circuit is also coupled to the external clock pin and the enable pin, the frequency tracking circuit selects one of the display synchronization signal and the external clock signal as the frequency tracking reference clock according to the enable signal.

7. A display driving integrated circuit, comprising:

a display synchronization signal pin, configured to receive a display synchronization signal;

a frequency tracking circuit, coupled to the display synchronization signal pin, wherein the frequency tracking circuit perforins a frequency tracking operation on an original internal clock signal to generate a tracked internal clock signal by selectively using the display synchronization signal as a frequency tracking reference clock, wherein the frequency tracking operation is performed by calculating an offset between the original internal clock signal of the display driving integrated circuit and the frequency tracking reference clock and adjusting a frequency of the original internal clock signal of the display driving integrated circuit to be consistent with a frequency of the frequency tracking reference clock; and a display driving circuit, coupled to the display synchronization signal pin, wherein the display driving circuit is coupled to the frequency tracking circuit to receive the tracked internal clock signal, and the display driving circuit is configured to drive a display panel according to the tracked internal clock signal and the display synchronization signal.

8. The display driving integrated circuit according to claim 7, wherein the display synchronization signal comprises a vertical sync signal or a horizontal sync signal.

9. The display driving integrated circuit according to claim 7, further comprising:

an external clock pin, configured to receive an external clock signal; and an enable pin, configured to receive an enable signal, wherein the frequency tracking circuit is also coupled to the external clock pin and the enable pin, the frequency tracking circuit selects one of the display synchronization signal and the external clock signal as the frequency tracking reference clock according to the enable signal.

10. An operation method of a display driving integrated circuit, comprising:

receiving a display synchronization signal;

performing a frequency tracking operation on an original internal clock signal to generate a tracked internal clock signal by selectively using the display synchronization signal as a frequency tracking reference clock, wherein the frequency tracking operation is performed by calculating an offset between the original internal clock signal of the display driving integrated circuit and the frequency tracking reference clock and adjusting a frequency of the original internal clock signal of the display driving integrated circuit to be consistent with a frequency of the frequency tracking reference clock; and driving a display panel according to the tracked internal clock signal and the display synchronization signal.

11. The operation method according to claim 10, wherein the display synchronization signal comprises a vertical sync signal or a horizontal sync signal.

12. The operation method according to claim 10, further comprising:

receiving an external clock signal;

receiving an enable signal; and selecting one of the display synchronization signal and the external clock signal as the frequency tracking reference clock according to the enable signal.

* * * * *